(12) United States Patent
Pahle et al.

(10) Patent No.: US 8,191,973 B2
(45) Date of Patent: Jun. 5, 2012

(54) METHOD FOR THE CREATION OF A POLE WHEEL/WHEEL HUB CONNECTION AND ARRANGEMENT THEREOF

(75) Inventors: Wolfgang Pahle, Bad Wiessee (DE); Thomas Lehner, Munich (DE); Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 940 days.

(21) Appl. No.: 11/783,409

(22) Filed: Apr. 9, 2007

(65) Prior Publication Data

US 2007/0246269 A1 Oct. 25, 2007

Related U.S. Application Data

(63) Continuation of application No. PCT/EP2005/010707, filed on Oct. 5, 2005.

(30) Foreign Application Priority Data

Oct. 8, 2004 (DE) .......................... 10 2004 049 355

(51) Int. Cl.
*B60B 27/00* (2006.01)
*G01P 3/48* (2006.01)
*F16D 65/12* (2006.01)

(52) U.S. Cl. ................ 301/105.1; 324/173; 188/181 A; 188/218 XL

(58) Field of Classification Search ............... 301/105.1
See application file for complete search history.

(56) References Cited

U.S. PATENT DOCUMENTS

| 4,795,278 | A | * | 1/1989 | Hayashi ..................... 384/448 |
| 4,940,937 | A | * | 7/1990 | Hattori ..................... 324/207.22 |
| 5,053,656 | A | * | 10/1991 | Hodge ..................... 324/200 |
| 5,067,597 | A | | 11/1991 | Young |
| 5,261,752 | A | * | 11/1993 | Ouchi et al. ............. 384/448 |
| 5,263,900 | A | | 11/1993 | Stimson |
| 5,350,041 | A | | 9/1994 | Steele et al. |
| 6,392,405 | B1 | * | 5/2002 | Nishizaki et al. ......... 324/173 |
| 6,568,512 | B1 | * | 5/2003 | Tolani ..................... 188/218 XL |
| 6,945,367 | B1 | * | 9/2005 | Yuhas ..................... 188/18 R |
| 7,134,732 | B1 | * | 11/2006 | Spokane et al. ......... 301/106 |

FOREIGN PATENT DOCUMENTS

| DE | 43 21 930 A1 | 1/1995 |
| DE | 44 45 236 C1 | 3/1996 |
| DE | 102 05 046 A1 | 8/2003 |
| EP | 0 507 339 A1 | 10/1992 |
| EP | 0 597 378 A1 | 5/1994 |

OTHER PUBLICATIONS international Search Report dated Jan. 10, 2006 with English translation (Five (5) pages).

* cited by examiner

*Primary Examiner* — Jason Bellinger
(74) *Attorney, Agent, or Firm* — Crowell & Moring LLP

(57) ABSTRACT

A method of forming a pole wheel connected to a wheel hub of a motor vehicle and a corresponding apparatus are described. A magnetically permeable, prefabricated pole wheel is placed in a mold for forming the wheel hub, and the mold is filled with a melt composed of a magnetically impermeable material in the solidified state. The melt fills the apertures formed between adjacent teeth of the pole wheel, while a shape of the pole wheel is substantially maintained.

17 Claims, 3 Drawing Sheets

METHOD FOR THE CREATION OF A POLE WHEEL/WHEEL HUB CONNECTION AND ARRANGEMENT THEREOF

CROSS REFERENCE TO RELATED APPLICATIONS

This application is a continuation of PCT International Application No. PCT/EP2005/010707, filed on Oct. 5, 2005, which claims priority under 35 U.S.C. §119 to German Application No. 10 2004 049 355.3, filed Oct. 8, 2004, the entire disclosures of which are expressly incorporated by reference herein.

BACKGROUND AND SUMMARY OF THE INVENTION

The present invention relates to a method for the creation of a pole wheel/wheel hub connection of a motor vehicle and arrangement thereof.

Pole wheels of this type are used as functional parts of anti-lock braking systems (ABS) in motor vehicles, where they are usually fixed in the connection region of a disk brake to the associated wheel hub of the motor vehicle.

In this example, the disk brake has a brake disk which is connected to the wheel hub and with which brake shoes make contact for the purpose of braking the motor vehicle, the braking operation being performed by friction linings of the brake shoes which are applied to the brake disk.

In addition to the brake disk, the pole wheel, which is operatively connected to a sensor, is fixed to the wheel hub in a rotationally secure manner. A pole wheel of this type is disclosed, for example, in DE 102 05 046 A1.

In this case, the pole wheel is connected to the wheel hub by an interlocking or friction connection as a punched sheet metal part. The pole wheel can also be in the form of a sintered part instead of being in the form of a punched sheet metal part. In other known solutions, teeth of the pole wheel which are at the same angular distance from one another are formed from the cast wheel hub by casting or material-removing machining, but this is associated with a considerable outlay on production. It is also known to use an associated wheel bearing seal in connection with active rotational-speed sensors as the pole wheel by the inclusion of magnetic particles.

In the case of uncovered pole wheels which are not completely shielded from external influences, as is the case when pole wheels are integrated in the wheel bearing seal, there is a risk of corrosion and contamination, in particular of the gap between the individual teeth, which gaps can also be formed by window-like apertures.

The rotational-speed signal can be disturbed or fail, particularly in the event of contamination by metallic constituent parts, such as those produced in the event of wear of the brake disk and the brake linings. In order to prevent this, attempts have been made to embed the pole wheel completely in plastic, but this is disadvantageous inasmuch as the temperatures which occur during braking place the plastic under an excessively great load, with the result that the service life of this type of connection is considered inappropriate for the requirements.

In addition to the problem of contamination, the type of fixing of the pole wheel to the rotating vehicle part known to date can also be considered disadvantageous. On account of different expansion coefficients and thermal conductions, high temperatures as are produced during braking operations can lead to this connection breaking down when the connection is created by a press fit between the pole wheel and the rotating vehicle part. It is therefore necessary to provide an additional interlocking connection, and this can be realized conventionally only with correspondingly high outlay on production and assembly. Moreover, a high level of outlay on assembly is also characteristic of the other configurations of the pole wheel mentioned, and so an unfavorable cost structure is the overall result.

The present invention thus provides a method for the creation of a pole wheel/wheel hub connection and an arrangement of a pole wheel/wheel hub connection by way of which the operational reliability of the pole wheel is improved and the costs of production and assembly are reduced.

The advantages according to the invention may be achieved by a method for forming a pole wheel to wheel hub connection in which the formed pole wheel is placed in a mold for the wheel hub, and a melt for forming the wheel hub is filled in, while maintaining the shape of the pole wheel and filling gaps between teeth thereof.

Additional advantages may also be, obtained by an arrangement having a pole wheel with teeth integrally cast into the wheel hub as a prefabricated part, with material of the wheel hub filling in the spaces between the teeth.

The invention provides a pole wheel/wheel hub unit which is distinguished by multiple advantages.

For example, assembly of the device is considerably simplified compared to the prior art, since only one unit has to be fixed at the vehicle end. Connection elements which have been used to date to fix the pole wheel to the wheel hub are no longer necessary, and neither are the structural conditions required therefor.

The influence of the heat which occurs during braking on the expansion coefficients and thermal conductions of different materials can also be ignored, since the pole wheel is embedded in the wheel hub and is therefore firmly anchored there.

In addition, production of the pole wheel/wheel hub unit can be realized in a relatively simple manner with low outlay on production. If necessary, only a small amount of machining is required in this case. This is predominantly the case when the customary material thicknesses of the pole wheel of 2 to 3 mm leads to deformation of the pole wheel on account of the casting temperature. In this exemplary embodiment, machining of the end surface of the wheel hub while at the same time uncovering the pole wheel tooth system can eliminate the existing deformation.

For problem-free production, the casting temperature has to be considerably below that of the pole wheel. In one example, aluminum alloys which can be processed at a casting temperature of 700 to 750° Celsius can be used as material for the wheel hub. There is no risk of the quality of the tooth system of the pole wheel being reduced in this temperature range.

A further requirement made of the material of the wheel hub is that the material itself must not be magnetically permeable, whereas the pole wheel is composed of a magnetically permeable material, usually steel, in order to be able to function.

The machining of both of the wheel hub and of the pole wheel uncovers the pole wheel, and the pole wheel is therefore subject to weather influences in a manner which carries a risk of corrosion. In order to prevent the corrosion, the pole wheel is, according to one exemplary advantageous embodiment of the invention, composed of a stainless steel which is magnetically permeable. For example, martensitic and ferritic, but not austenitic, stainless steels in particular are suitable for this purpose.

By virtue of the pole wheel being integrally cast into the wheel hub, the recesses or apertures between the teeth are filled and virtually hermetically sealed by the material of the wheel hub, with the result that contamination, in particular metal particles which adversely affect the ability of the pole wheel to function, is effectively prevented. In this respect, the unit provided exhibits a considerable improvement in operational reliability, especially since failure of the overall system resulting from contamination is virtually excluded.

According to the embodiments of the invention, a significant increase in service life is produced by virtue of the described method and arrangement, which reduces operating costs, and, in addition to the reduced costs of production and assembly, leads to a very substantial economic improvement.

Other objects, advantages and novel features of the present invention will become apparent from the following detailed description of the invention when considered in conjunction with the accompanying drawings.

BRIEF DESCRIPTION OF THE DRAWINGS

An exemplary method according to the invention and an exemplary embodiment of an arrangement of a pole wheel/wheel hub connection are described below with reference to the attached drawings, in which.

DETAILED DESCRIPTION OF THE DRAWINGS

Figure 1:
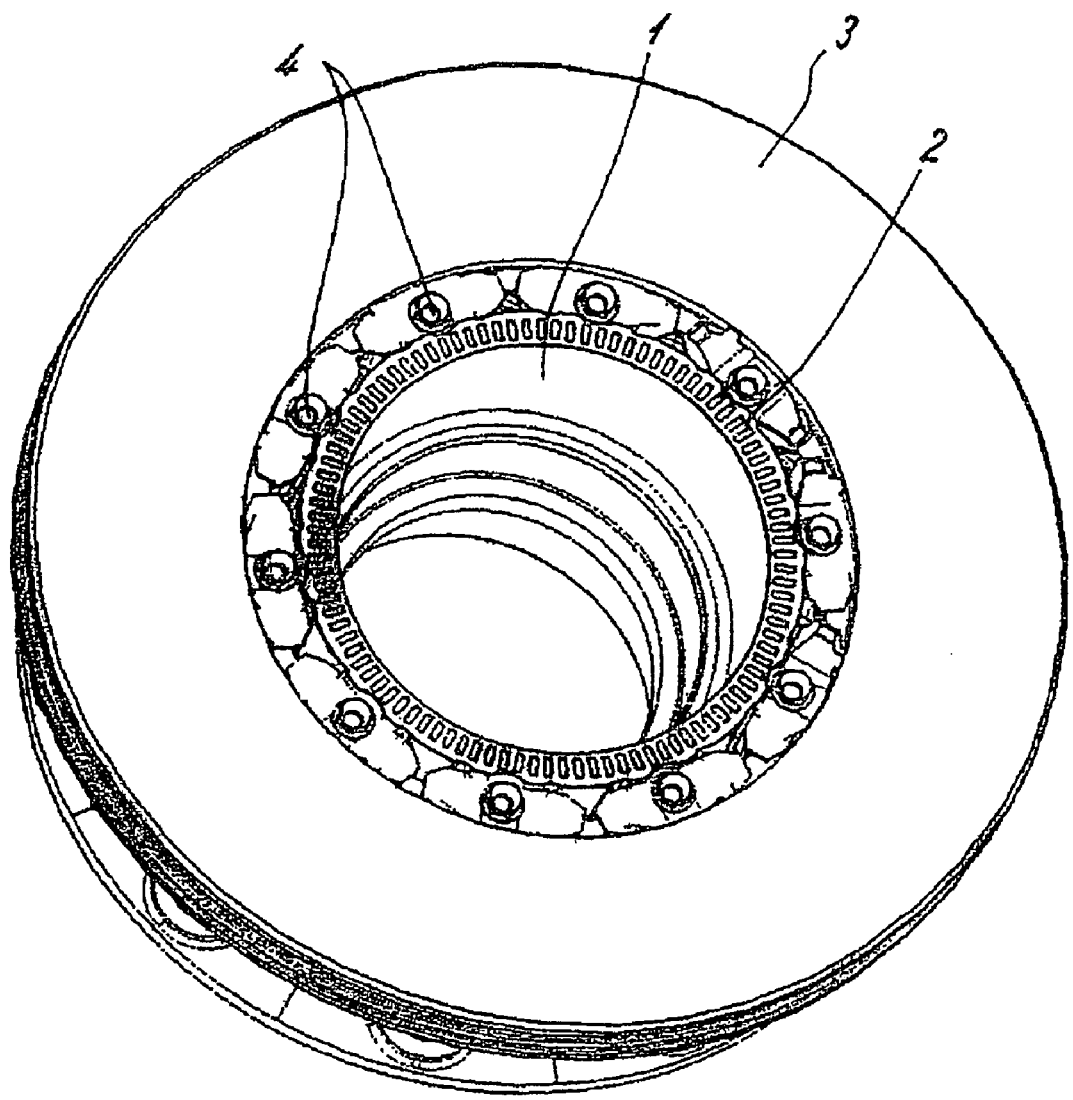
FIG. 1 shows a perspective view of an assembled pole wheel/wheel hub connection.
Figure 2:
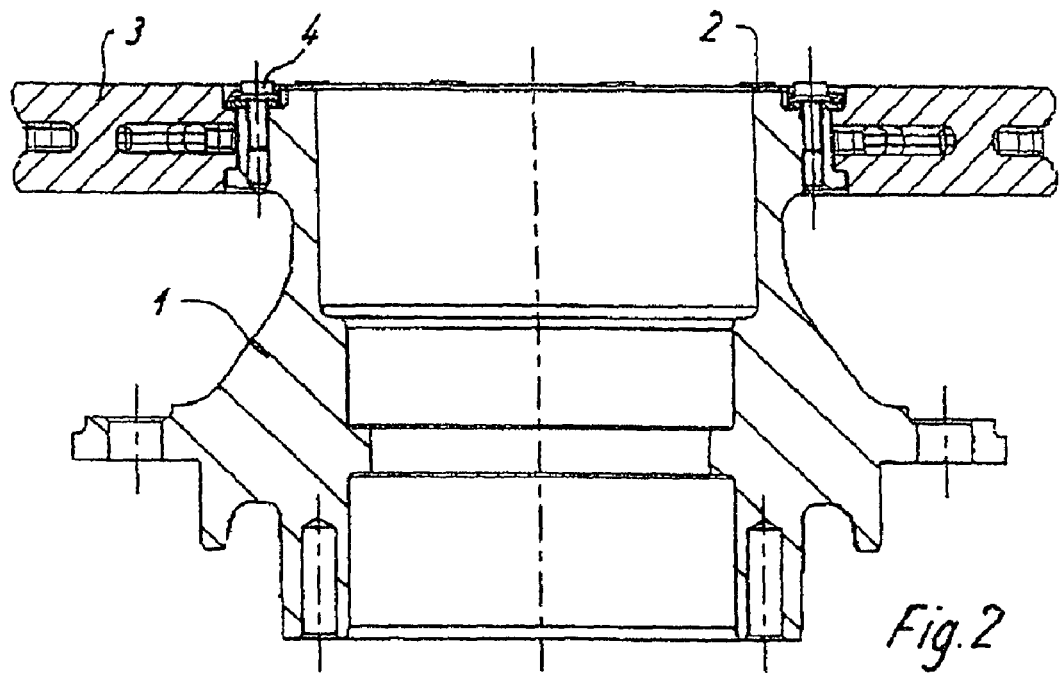
FIG. 2 shows a longitudinal section through the connection according to FIG. 1.
Figure 3:
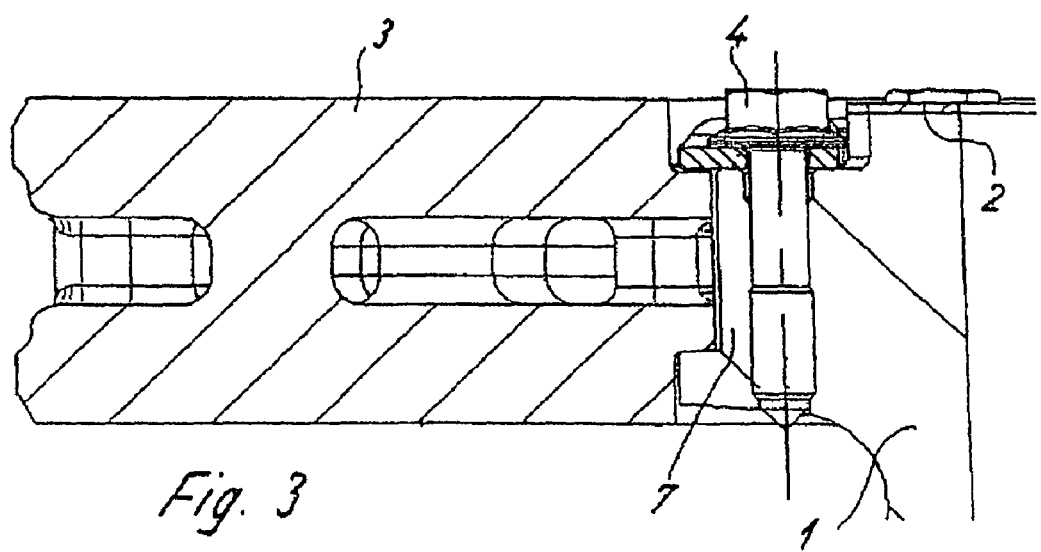
FIG. 3 shows a longitudinal section through an enlarged detail of the connection.

FIGS. 1 to 3 illustrate an exemplary arrangement of a pole wheel/wheel hub connection of a motor vehicle according to an embodiment of the invention, with the magnetically permeable pole wheel 2 being provided with a large number of apertures 5 which are arranged at substantially the same angular distance from one another, and between each of which a tooth 6 is formed.

Figure 4:
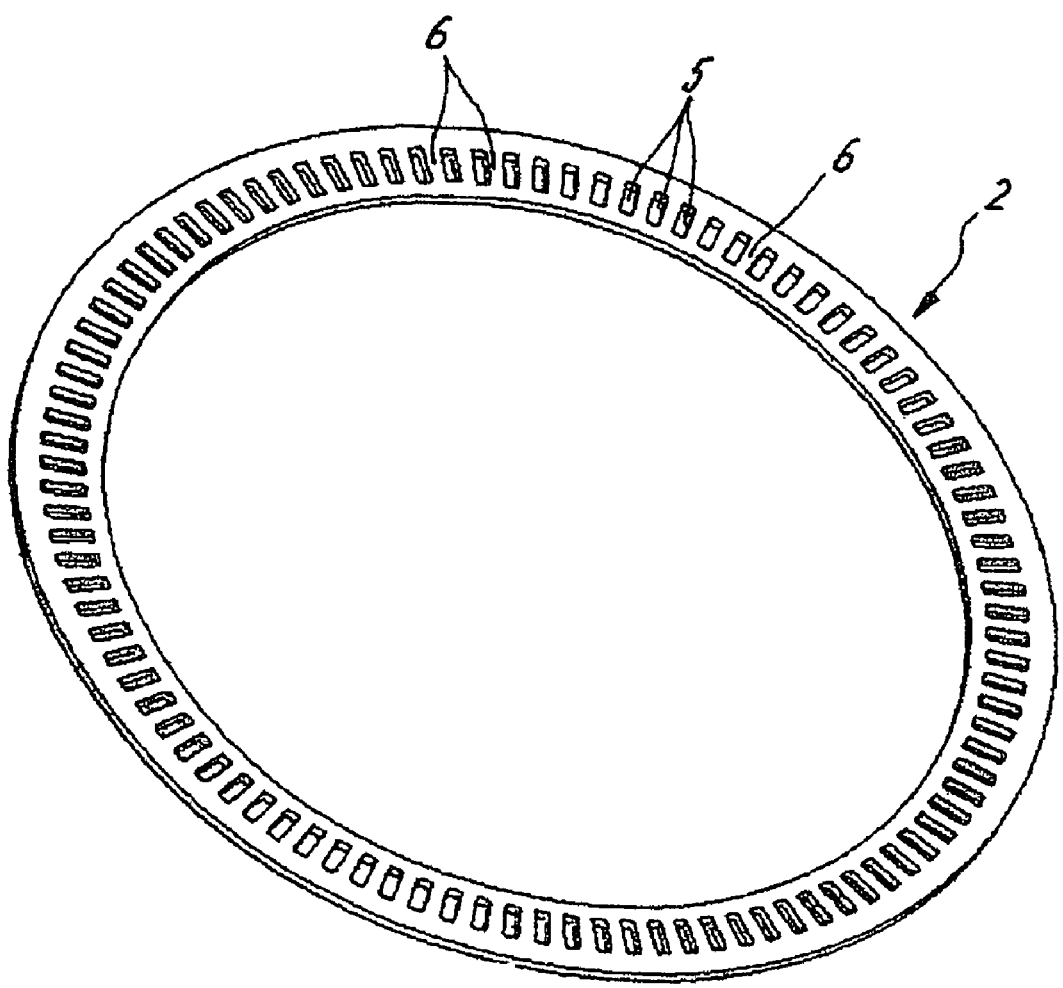
FIG. 4 shows a detail illustration of a pole wheel.

As shown in detail in FIG. 4, the pole wheel 2 may be in the form of a punched, annular, flat sheet metal part in which the apertures 5 and the teeth 6 extend radially.

FIG. 1 shows the pole wheel/wheel hub connection to which a brake disk 3 may be connected by using screws 4, with the screws 4 being screwed into a circumferential collar 7 of the wheel hub 1.

The exemplary pole wheel 2 is integrally cast in the wheel hub 1 as a prefabricated sheet metal part, for which reason the sheet metal part is placed into a mold for the wheel hub 1 and the melt which forms the wheel hub and is composed of a magnetically impermeable material in the solidification state is then filled into the mold, while the shape of the pole wheel 2 is largely maintained.

In this exemplary embodiment, the pole wheel 2 is positioned such that it substantially forms the end face region, which faces the brake disk 3, of the wheel hub 1, with the melt for the wheel hub 1 completely filling the apertures 5 in the pole wheel 2.

In order to eliminate any possible deformation of the pole wheel which acts on the pole wheel 2 by virtue of the melt heat during casting of the wheel hub 1, the pole wheel/wheel hub connection can be machined in the region of the corresponding end face of the wheel hub 1, with the result that a flat surface is produced.

In order to minimize deformation, the material selected for the wheel hub 1 is a material with a lower melting temperature than the material of the pole wheel 2, which, for example, is composed of a stainless, martensitic or ferritic, magnetically permeable steel. Preferably the wheel hub material is an aluminum alloy which is magnetically impermeable. As a result, efficient pulse generation, which is produced by alternating between apertures 5 and teeth 6, for operation of the anti-lock braking system is ensured in cooperation with a sensor (not illustrated) which is operatively connected to the pole wheel 2.

The reliable combination of the pole wheel 2 with the wheel hub 1 means the operation-induced influences, for example by frictional heat produced during braking, have no effect.

The following list of reference symbols is included to facilitate the understanding of the above description and figures.

1 Wheel hub
2 Pole wheel
3 Brake disk
4 Screw
5 Aperture
6 Tooth
7 Collar

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of forming a pole wheel connected to a wheel hub of a motor vehicle, comprising the acts of:
   placing a magnetically permeable, prefabricated planar pole wheel in a mold for forming the wheel hub, the prefabricated planar pole wheel being punched from a flat metal sheet to have teeth between which are apertures extending through the pole wheel;
   filling the mold with a melt for forming the wheel hub, the melt being composed of a magnetically impermeable material in the solidified state;
   filling, with the melt, the apertures to form a pole wheel/wheel hub connection, wherein casting temperature causes a deformation of the planar pole wheel; and
   machining the pole wheel/wheel hub connection in a region corresponding to an end face of the wheel hub to produce a flat surface.

2. A component of a motor vehicle, comprising:
   a wheel hub;
   a magnetically permeable prefabricated punched flat sheet metal pole wheel, integrally cast with the wheel hub; and
   a plurality of teeth of the pole wheel which are arranged at a substantially identical angular distance from one another and extend radially,
   a plurality of apertures extending through the pole wheel, each aperture being located between pairs of the plurality of teeth, wherein the apertures are filled by material of the wheel hub during casting to form a pole wheel/wheel hub connection, wherein casting temperature causes a deformation of the pole wheel, and wherein the pole wheel/wheel hub connection is machined in a region corresponding to an end face of the wheel hub to produce a flat surface.

3. The component as claimed in claim 2, wherein the pole wheel is in the form of a planar ring.

4. The component as claimed in claim 2, wherein the wheel hub is cast from a material having a casting temperature lower than that of a material of the pole wheel.

5. The component as claimed in claim 4, wherein the wheel hub is cast from a material having the casting temperature of approximately between 700° and 750° Celsius.

6. The component as claimed in claim 2, wherein the wheel hub is composed of a magnetically impermeable material.

7. The component as claimed in claim 2, wherein the wheel hub is composed of an aluminum alloy.

8. The component as claimed in claim 2, wherein the pole wheel is composed of stainless steel.

9. The component as claimed in claim 8, wherein the pole wheel is composed of one of martensitic and ferritic stainless steel.

10. The component as claimed in claim 7, wherein the pole wheel is composed of stainless steel.

11. The component as claimed in claim 2, wherein the wheel hub is cast from a material having a casting temperature lower than that of stainless steel.

12. A method of connecting a pole wheel to a wheel hub, comprising the acts of:

prefabricating a planar, magnetically permeable pole wheel by punching a flat sheet metal part to form gaps between teeth, the gaps extending through the pole wheel;

placing the prefabricated planar magnetically permeable pole wheel in a mold for forming the wheel hub;

pouring a magnetically impermeable wheel hub material in the mold, thereby filling the gaps between adjacent teeth of the pole wheel with the wheel hub material to form a pole wheel/wheel hub connection and causing deformation of the planar pole wheel due to casting temperature; and machining the pole wheel/wheel hub connection in a region corresponding to one end face of the wheel hub to produce a flat surface.

13. The method according to claim 12, further comprising forming the wheel hub of a material having lower casting temperature than that of the pole wheel.

14. The method according to claim 13, further comprising forming the pole wheel from stainless steel.

15. The method according to claim 13, further comprising forming the wheel hub from an aluminum alloy.

16. The component as claimed in claim 2, wherein the magnetically permeable prefabricated punched flat sheet metal pole wheel has a thickness of approximately 2-3 mm.

17. The method according to claim 12, wherein the prefabricated, planar, magnetically permeable pole wheel has a thickness of approximately 2-3 mm.

* * * * *